Feb. 14, 1950   J. R. McCASKILL   2,497,506
GARDEN TOOL
Filed July 6, 1945
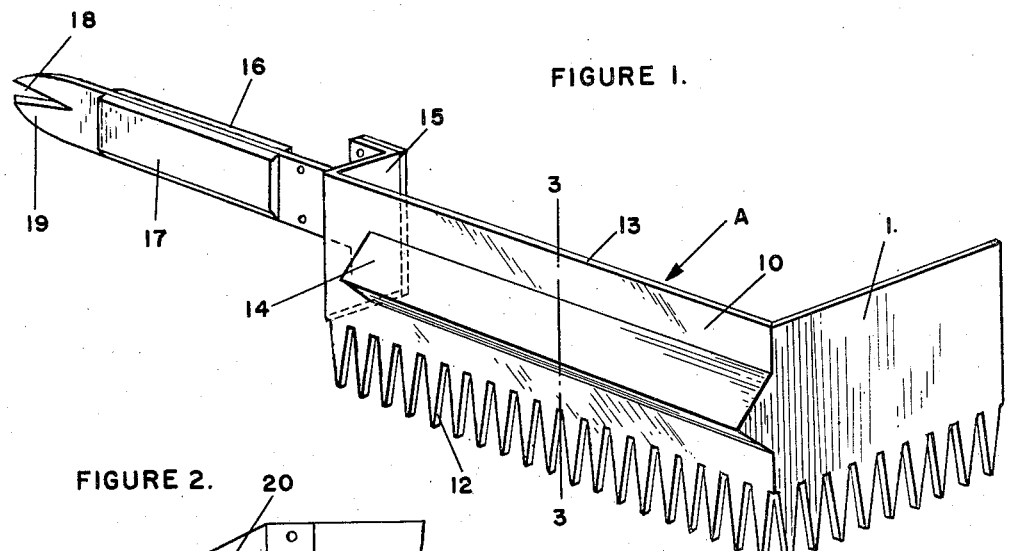
FIGURE 1.
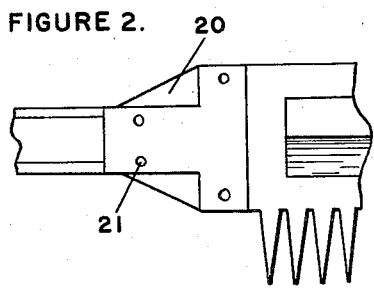
FIGURE 2.
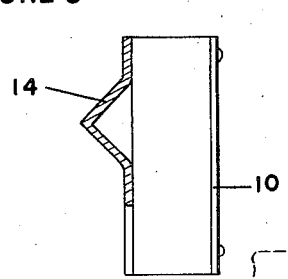
FIGURE 3
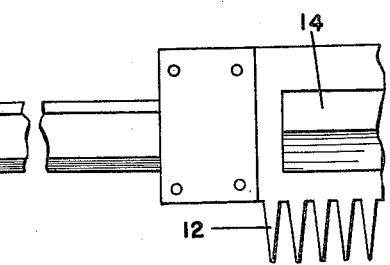
FIGURE 4
FIGURE 5
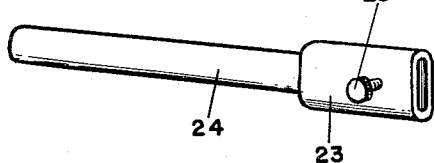
FIGURE 6.
JOSEPH R. MC CASKILL
INVENTOR
BY Victor J. Evans & Co.
ATTORNEYS Patented Feb. 14, 1950

2,497,506

UNITED STATES PATENT OFFICE 2,497,506

GARDEN TOOL

Joseph R. McCaskill, Oakland, Calif.

Application July 6, 1945, Serial No. 603,481

1 Claim. (Cl. 97—62)

The invention relates to a garden tool and more especially to a combination implement for garden use.

The primary object of the invention is the provision of a tool or implement of this character wherein the construction of the same is such as to permit its use as a rake, hoe, or ground leveling means as well as a weeder and furrow former, thus giving variable utility to the tool or implement in the use of the same.

Another object of the invention is the provision of a tool or implement of this character, wherein the same will permit of the pulling of weeds, dandelion or other growing plants and also will enable the placement of young plants for the proper planting thereof, being manually operated and usable both in flower and vegetable gardens.

A further object of the invention is the provision of a tool or implement of this character, which is simple in construction, thoroughly reliable and efficient in operation, readily and easily handled, light in weight yet strong, durable and inexpensive to manufacture.

With these and other objects in view, the invention consists in the features of construction, combination and arrangement of parts as will be hereinafter more fully described, illustrated in the accompanying drawing, which discloses the preferred and modified forms of embodiment of the invention and pointed out in the claim hereunto appended.

In the accompanying drawing:

Figure 1 is a perspective view of an implement or tool constructed in accordance with the invention.

Figure 2 is a fragmentary side elevation.

Figure 3 is a sectional view taken on the line 3—3 of Figure 2.

Figure 4 is a view similar to Figure 3 showing a slight modification.

Figure 5 is a top edge view thereof.

Figure 6 is a perspective view of an extension handle for the tool.

Similar reference characters indicate corresponding parts throughout the several views in the drawing.

Referring to the drawing in detail, particularly Figures 1 to 3 inclusive, A designates the tool or implement constructed in accordance with the invention and comprises a main blade 10 having a laterally extending supplemental blade 11 at right angles thereto, being integrally formed at one end of the main blade. These blades 10 and 11 at one edge have cut therein teeth 12, these in the group thereof forming a raking side to the tool or implement while the opposite edge 13 of the tool or implement throughout the blades functions as a scraper.

The blade 10 has struck therefrom at the longitudinal median or substantially at the longitudinal center of the same an outwardly directed substantially V-shaped rib 14, being co-extensive with the said blade for the major extent thereof.

The main blade 10 at the end opposite the supplemental blade 11 has an offset wing 15 terminating in a handle 16 having gripping faces 17. The outer free end of the handle 16 is rounded at opposite edges to give a tapered formation thereto and in this end is a V-shaped notch 18 effecting a claw terminal. The edges of the notch 18 are beveled for presenting knife edges 19.

The handle 16 at the juncture thereof with the offset wing 15 is reinforced by a brace piece 20 which is riveted or otherwise secured at 21 in place.

The offsetting of the handle 16 allows the main blade 10 to be laid flat upon a ground surface so that the rib 14 will form a groove, rut or furrow in the said surface of sufficient depth for the proper planting of seeds. The supplemental blade 11 can be utilized as a hoe while the teeth 12 function for the use of the tool or implement as a rake. The end 18 of the handle 16 can function as a weeder, puller or extractor and additionally for the holding of plants when planting the same in the ground, the plant stem being received in the notch 18.

In Figures 4, 5 and 6 there is shown a slight modification of the invention wherein the handle 22, which is similar to the handle 16, is adapted to be fitted into the socket end 23 of an extension handle 24, this socket end carrying a set screw 25 being usable for the fastening of the extension 24 upon the handle 22. In this manner, the length of the handle is increased so that a user may assume a standing position in contradistinction to a stooping or kneeling position when using the device with the handle 16 only.

The tool or implement in its use is serviceable for removal of weeds, that is, the pulling of the same from the ground, being adaptable to grasp the root of a small plant such as a tomato plant, sweet potato slip, etc., for the placement thereof in the ground. Also the tool or implement may be used as a hoe, a scraper, digger, ground leveling device as well as for the formation of an open furrow in the soil. The tool or implement is serviceable for use in vegetable or flower gardens.

What is claimed is:

An agricultural tool consisting of a handle portion, an offset wing portion projecting laterally at right angles from said handle portion, a main blade attached at right angles to said offset wing portions and extending in a direction opposite to said handle portion, a supplemental blade extending laterally at right angles from said main blade, said supplemental blade being parallel to said offset wing portion and extending beyond the axis of said handle portion, a continuous row of ground-engaging teeth extending along one edge of said main blade and supplemental blade, and a V-shaped reinforcing rib extending from and lengthwise of said main blade above the teeth thereof, said rib having its apex spaced from said main blade in a direction opposite to said supplemental blade and having one end terminating in a plane at right angles to said main blade and its other end in a plane at right angles to said main blade and flush with said supplemental blade.

JOSEPH R. McCASKILL.

REFERENCES CITED

The following references are of record in the file of this patent:

UNITED STATES PATENTS

| Number | Name | Date |
| --- | --- | --- |
| 607,273 | Purdy | July 12, 1898 |
| 1,006,819 | Adams | Oct. 24, 1911 |
| 1,105,815 | Milleman | Aug. 14, 1914 |
| 1,352,386 | Rundberg | Sept. 7, 1920 |
| 1,632,260 | Woodall | June 14, 1927 |
| 1,666,374 | Gatti | Apr. 17, 1928 |
| 1,757,942 | Geffken | May 6, 1930 |
| 2,010,325 | Sawyer | Aug. 6, 1935 |

FOREIGN PATENTS

| Number | Country | Date |
| --- | --- | --- |
| 19,744 | Denmark | Jan. 13, 1915 |